United States Patent [19]

Wedding

[11] Patent Number: 5,381,193
[45] Date of Patent: Jan. 10, 1995

[54] PROTECTIVE FILTER LENSES

[75] Inventor: Brent M. Wedding, Corning, N.Y.

[73] Assignee: Corning Incorporated, Corning, N.Y.

[21] Appl. No.: 20,782

[22] Filed: Feb. 22, 1993

[51] Int. Cl.⁶ .................... G02C 7/10; C03B 11/08
[52] U.S. Cl. ......................... 351/163; 65/37; 351/177
[58] Field of Search ............... 351/163–165, 351/177; 65/30.11, 30.12, 30.13, 37

[56] References Cited

U.S. PATENT DOCUMENTS

| | | | |
|---|---|---|---|
| 3,208,860 | 9/1965 | Armistead et al. | 106/54 |
| 3,892,582 | 7/1975 | Simms | 106/52 |
| 3,920,463 | 11/1975 | Simms | 106/54 |
| 4,190,451 | 2/1980 | Hares et al. | 106/47 Q |
| 4,240,836 | 12/1980 | Borrelli et al. | 106/47 Q |
| 4,284,686 | 8/1981 | Wedding | 428/334 |
| 4,290,794 | 9/1981 | Wedding | 65/30.11 |
| 4,311,368 | 1/1982 | Saito et al. | 351/165 |
| 4,390,635 | 6/1983 | Morgan | 501/13 |
| 4,537,612 | 8/1985 | Borrelli et al. | 65/30.11 |
| 4,710,430 | 12/1987 | Borrelli et al. | 428/432 |
| 4,832,724 | 5/1989 | Borrelli et al. | 65/30.11 |
| 4,840,655 | 6/1989 | Borrelli et al. | 65/30.11 |
| 4,878,748 | 11/1989 | Johansen et al. | 351/44 |

*Primary Examiner*—Scott J. Sugarman
*Attorney, Agent, or Firm*—Milton M. Peterson; Clinton S. Janes, Jr.

[57] ABSTRACT

An ophthalmic protective filter lens having a scotopic transmittance lower than the photopic transmittance by more than a factor of two, a dominant wavelength within the ranges of 580–605 nm and a color purity of 75–85 whereby colors perceived through the lens are approximately those of the scene being viewed. A method of producing an ophthalmic protective filter lens which comprises firing a photochromic glass lens in a hydrogen-containing atmosphere within the temperature range of 400°–430° C. for a time of 1–8 hours to impart a scotopic transmittance lower than the photopic transmittance by a factor of at least two, a dominant wavelength within the ranges of 580–605 nm and a color purity of 75–85 whereby colors perceived through the lens are approximately those of the scene.

14 Claims, 4 Drawing Sheets

PROTECTIVE FILTER LENSES

FIELD OF THE INVENTION

The field is ophthalmic filter lenses designed to protect the eye from the effects of strong sunlight.

BACKGROUND OF THE INVENTION

My prior U.S. Pat. No. 4,284,686 explains in some detail that certain diseases of the eye and/or visual deficiencies may be caused by, or may be aggravated by, strong sunlight. The patent notes that radiation at the short end of the visible spectrum, that is, at wavelengths on the order of 400-550 nanometers (nm), seem to create the greatest problems.

In discussing the effect of strong sunlight on the eye, the patent observes that the eye contains two different kinds of photoreceptors, viz., cones and rods. The cones comprise the principal receptors in daylight vision (photopic vision), and the rods constitute the principal receptors in night vision (scotopic visions).

The cones are located generally in the central portion of the retina and permit the recognition of fine detail, presumably because they function largely independently of one another. The cones also permit color vision, i.e., they allow hues and saturation to be distinguished. In the presence of bright light, the eye is most sensitive to radiation at about 555 nm.

In general, the rods are located in the peripheral portions of the retina, there being few if any rods found in the central retina. The rods do not permit the recognition of colors, only shades of gray. Their peak wavelength sensitivity is near 510 nm.

As a corrective measure, the patent provides photochromic glasses that are treated to produce a colored surface layer. The colored surface layer exhibits near-zero transmittance of radiations having wavelengths shorter than a selected cutoff wavelength in the range 440-550 nm. The photochromic feature permits the same spectacles to be used both indoors and outside. To develop the colored layer, the photochromic glass is heated in a strongly reducing atmosphere, such as hydrogen. The exposure is at temperatures in the range of 350°-520° C. for at least 12 hours.

All of the commercially important photochromic glasses are glasses which contain a precipitated microcrystalline silver halide phase. It is this phase which is considered to cause the reversible darkening of the glass under exposure to light. U.S. Pat. No. 3,208,860 (Armistead et al.) provides the basic description of this family of glasses. Subsequent work has resulted in the development of many new families of photochromic glasses exhibiting faster darkening and/or fading response. U.S. Pat. No. 4,190,451 (Hares et al.), for example, provides a description of some recently developed photochromic glasses of this type.

Photochromic glasses exhibiting a fixed color or tint in the undarkened state have also been commercially developed. Such products have included glasses containing conventional glass colorants, as well as glasses wherein coloration is imparted by treatment of the glass after manufacture with a coloring surface treatment, rather than by the inclusion of glass colorants in composition. U.S. Pat. Nos. 3,892,582 and 3,920,463 (Simms) for example, disclose thermal reduction treatments useful for imparting yellow surface colors to photochromic glasses, while U.S. Pat. No. 4,240,836 (Wedding) describes a modified thermal reduction treatment which permits the development of a broader range of colors in this type of glass.

Colored ophthalmic lenses, developed in accordance with the patent teachings, have provided relief for patients having light or glare sensitivity problems. Dye-impregnated plastic lenses have been developed as alternatives. The latter are sometimes referred to as "blockers" since they are stated to absorb all of the light below a certain wavelength.

A major problem with the "blocker" lens is that total absorption of part of the spectrum greatly distorts color perception. This may also occur in the surface colored glass lens with an unduly long treating time. However, the time of the reducing treatment may be adjusted so that a carefully controlled small amount of blue transmission, referred to as a "blue leak", occurs. This provides a less severe distortion of color perception.

PURPOSES OF THE INVENTION

It would be desirable to provide an improved ophthalmic filter lens having substantially diminished transmittance below a wavelength of 550 nm. In particular, it would be desirable to reduce the sensitivity to sunlight while at least approximating natural color perception. A basic purpose of this invention is to provide such improved lens.

It has been reported in the medical literature that substantial deterioration in nocturnal vision occurs following prolonged exposure to bright sunlight without eye protection. Normally, this is not a permanent effect. Rather, normal nocturnal vision is recovered in time. However, there is an interim of reduced visual function that could prove dangerous for persons having a need for quick, accurate vision after darkness descends. A further purpose is to provide an ophthalmic filter lens that requires less time for recovery, by the user, of normal nocturnal vision after exposure to bright sunlight.

Ideally, an ophthalmic lens filter would combine these features. Thus, it would not only provide protection against strong sunlight without distortion of color perception, but would also require a reduced time for dark adaptation to take place. It is another purpose to provide such a lens.

SUMMARY OF THE INVENTION

In furtherance of the above, and other apparent purposes, my invention resides in an ophthalmic protective filter lens having a scotopic transmittance ($Y_S$) lower than the photopic transmittance ($Y_P$) by more than a factor of two, a dominant wavelength within the range of 580-605 nm and a color purity in the range of 75-85%, whereby colors perceived through the lens are approximately those of the scene being viewed. In an embodiment, a lens is composed of a photochromic glass having a coloration developed in at least one surface.

In one specific embodiment, the photochromic lens, in its faded state, has a photopic transmittance ($Y_P$) not over about 20% and a scotopic transmittance ($Y_S$) in the range of 2.5-5%, preferably with a transmittance ratio ($Y_P$:$Y_S$) in the range of 3.0-3.5:1.

In another specific embodiment, the photochromic lens, in its faded state, has a photopic transmittance in the range of 25-50% and a scotopic transmittance in the range of 5-13%, also preferably with a transmittance ratio in the range of 3.0-3.5:1.

The invention is further embodied in a method of producing an ophthalmic protective filter lens which comprises firing a photochromic glass lens in a strongly reducing atmosphere at a selected time-temperature cycle in the range of 2–12 hours at a temperature in the range of 320°–550° C., the time-temperature cycle being such as to provide the lens with a scotopic transmittance lower than the photopic transmittance by more than a factor of two, a dominant wavelength within the range of 580–605 nm and a color purity of 75–85%.

In one embodiment, the photochromic glass consists essentially of, as expressed in weight percent on the oxide basis, 0–2.5% $Li_2O$, 0–9% $Na_2O$, 0–17% $K_2O$, and 0–8 $Cs_2O$, the sum of $Li_2O+Na_2O+K_2O+Cs_2O$ ($R_2O$) being 8–20%, 5–25% $Al_2O_3$, 14–23% $B_2O_3$, 40–65% $SiO_2$ and 0–25% $P_2O_5$ and containing silver halide crystals in the silicate glass matrix. The glass may be fired in a hydrogen-containing atmosphere for about eight hours at about 420° C. and then front surfaced.

In a further embodiment, the glass contains 0.004–0.02% CuO, 0.15–0.3% Ag, 0.1–0.25% Cl, 0.1–0.2% Br, and about 0.05–0.3% $As_2O_3$ and/or $Sb_2O_3$, the molar ratio of $R_2O:B_2O_3$ being between 0.55 and 0.85, the weight ratio of Ag:Cl+Br being between 0.65 and 0.95 and the glass containing oxides of cobalt and nickel in amounts to provide a neutral grey. The glass may be fired in hydrogen on a time-temperature cycle of about 2 hours at about 420° C.

PRIOR ART

In addition to the patents already mentioned, attention is directed to the following United States Patents of possible interest, U.S. Pat. No. 4,190,451 (Hares et al.) and U.S. Pat. No. 4,390,635 (Morgan) disclose the photochromic glasses preferred for use in practicing the present invention.

U.S. Pat. No. 4,240,836 (Borrelli et al.), U.S. Pat. No. 4,290,794 (Wedding), U.S. Pat. No. 4,537,612 (Borrelli et al.), U.S. Pat. No. 4,710,430 (Borrelli et al.), U.S. Pat. No. 4,832,724 (Borrelli et al.) and U.S. Pat. No. 4,840,655 (Borrelli et al.) disclose various methods of imparting and/or modifying surface coloration on photochromic glasses.

BRIEF DESCRIPTION OF THE DRAWINGS

In the accompanying drawings.

DESCRIPTION OF THE INVENTION

Figure 1:
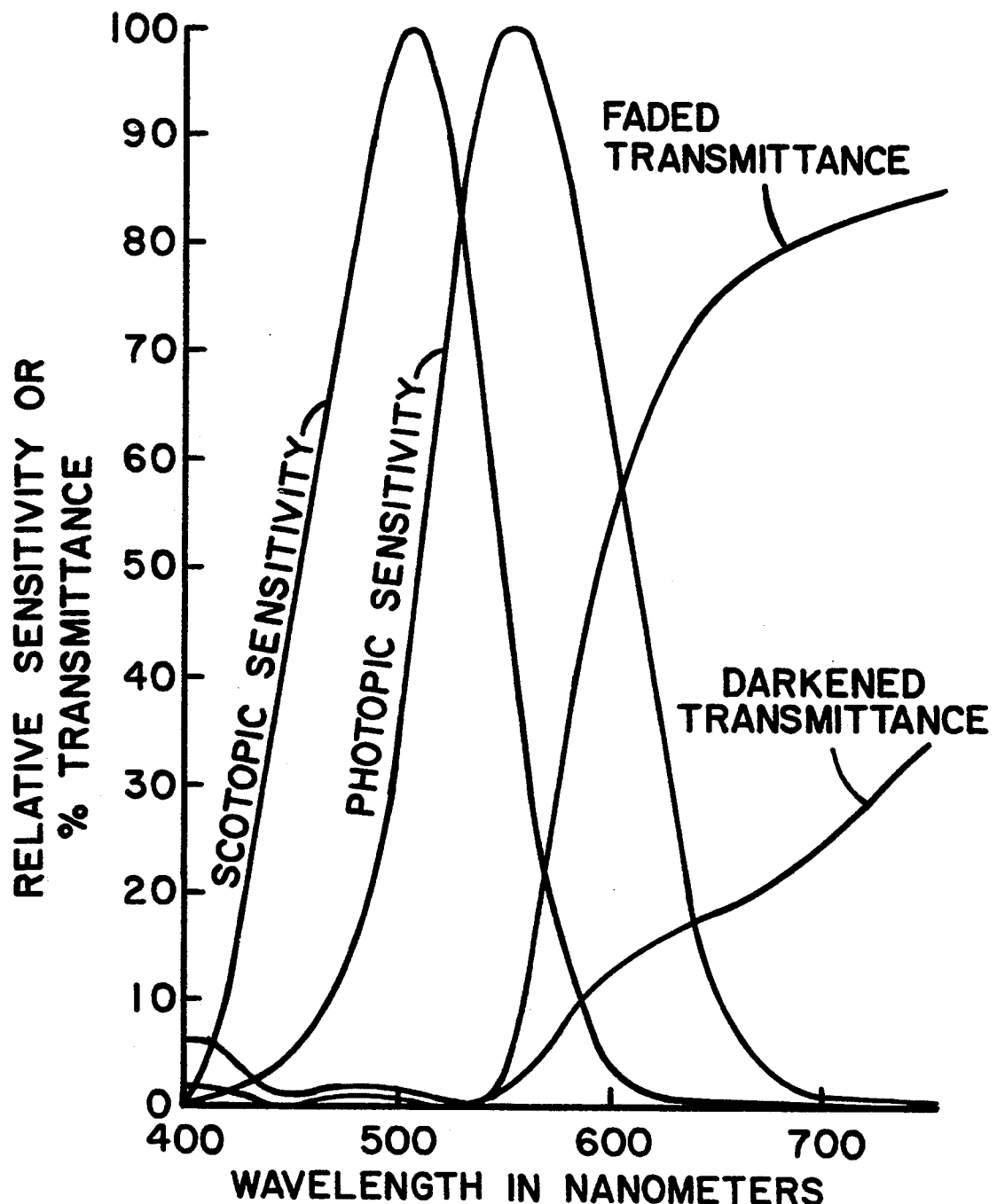
FIG. 1 is a graphical representation, taken from my prior -686 patent, of the relative wavelength response for photopic and scotopic vision; also, the spectral transmittance curves in the faded state and the darkened state as measured on a photochromic glass.

The present invention arose from reports in the medical literature that substantial deterioration in nocturnal vision follows prolonged exposure to bright sunlight without eye protection. It was noted that the effect is not permanent. However, the duration of reduced visual function is sufficiently long to increase the night time risk to combat personnel or vehicle drivers.

The reports suggested dark glasses to reduce the risk and provide protection from sunlight. Accordingly, a study was made to compare a standard dark filter glass, a neutral density (ND 0.6) filter, with two glasses developed in accordance with teachings in my U.S. Pat. No. 4,284,686. These glasses were developed for use by impaired vision patients, and had relatively sharp spectral cutoffs at 522 and 550 nms. Photopic transmittance ($Y_P$), scotopic transmittance ($Y_S$) and the ratio $R=Y_P:Y_S$ were determined for each glass. The results are shown in TABLE I below:

TABLE I

| Lens | $Y_P$ | $Y_S$ | R |
|---|---|---|---|
| ND 0.6 | 25 | 25 | 1.0 |
| 522 | 45 | 15 | 3.0 |
| 550 | 21 | 2.6 | 8.0 |

A dark adaptation experiment was then conducted in which subjects were fitted for testing with a pair of lenses created from one of the glasses in TABLE I. The subjects were exposed to a bright light for five minutes and then taken into a darkened room where the lenses were removed. They were then asked to identify dimly lighted targets. As time progressed, targets having lower and lower lighting levels could be seen. The currently visible lowest lighting level was recorded at one minute intervals for about 20 minutes.

It was found that subjects who had been wearing the ND 0.6 and 522 lenses could identify the brightest of the targets after about two minutes, and that the subject who had the 550 lenses could see a much more dimly lighted target at that time. For purposes of illustration, the level of the brightest target is set at 1000 arbitrary units. TABLE II shows the levels seen by the subjects after 2, 4, 6, 8 and 10 minutes of recovery time. In an experiment such as this, the transition from cone vision to rod vision typically takes place after the subject has been in darkness for about seven minutes. The subject using the 550 lenses could identify targets having illumination levels below the cone vision threshold in less than two minutes. Since the recovery time is found to be inversely proportional to the scotopic transmittance of the test lens, it is concluded that the low scotopic transmittance of the 550 lens caused the enhanced night vision recovery.

TABLE II

| Time in Dark | ND 0.6 | 522 | 550 |
|---|---|---|---|
| 2 min. | 1000 | 1000 | 40 |
| 4 | 630 | 200 | 8 |
| 6 | 400 | 80 | 4 |
| 8 | 80 | 16 | 1.4 |
| 10 | 20 | 10 | 0.8 |

Studies were then directed to obtaining the indicated advantage together with more natural color perception. In this study, so-called "blocker" lenses were compared with lenses that provided a small, controlled transmission in the blue portion of the spectrum.

Experimental lenses were made from a photochromic glass having a neutral gray fixed tint, and having the following composition in percent by weight:

| | |
|---|---|
| $SiO_2$ | 56.4 |
| $B_2O_3$ | 18.1 |
| $Al_2O_3$ | 6.2 |
| $Li_2O$ | 1.8 |

-continued

| | |
|---|---|
| Na$_2$O | 4.1 |
| K$_2$O | 5.7 |
| ZrO$_2$ | 5.0 |
| TiO$_2$ | 1.9 |
| Ag | 0.24 |
| CuO | 0.0057 |
| Cl | 0.22 |
| Br | 0.16 |
| CoO | 0.08 |
| NiO | 0.14 |

Three of the lenses were fired for 2 hours in pure hydrogen at temperatures in the range of 400°–415° C. Lens A was fired at 400° C.; lens B at 410° C.; lens C at 415° C.

The lenses were visually tested in bright sunlight to determine what, if any, modification of color perception occurred. Lens A, which appeared the reddest and had the largest blue transmittance, made normal blue colors appear purplish and normal whites appear reddish. Lens C, which had the least blue transmission, gave weakened blue colors and gave white colors a yellowish cast. Lens B provided quite normal color perception once the eyes had time to accommodate to the sunlight.

To determine the effect of complete blocking, two sharp cut filter glasses were separately combined with lens B. One filter glass is known under the designation CS3-72. Its transmission rises sharply in the range of 425–450 nm so that about half of the blue portion of the spectrum is cut off. The second filter is known under the designation CS3-70. Its transmission rises sharply in the range of 75–525 nm so that virtually all of the blue portion of the spectrum is removed. When the first filter lens was combined with lens B for viewing, the sky lost its deep blue color and white became yellowish similar to lens C. When the second lens was combined with lens B, the white becomes a more intense yellow to orange color, and the blue sky fades almost completely.

Based on these and other studies, certain design feature targets were determined as follows for a sunglass product:

1. Faded photopic transmittance between 15 and 20%.
2. Minimum color distortion.
3. Low scotopic transmittance, preferably below 5%.

Lens samples were prepared in the form of plano uncut blanks from a glass having the composition set forth earlier. These lens samples had a nominal 2 mm thickness and were heat treated in a flowing hydrogen atmosphere. The effect of treatment time was determined by treating different samples at different times at a temperature of 415° C. The effect of varying temperature was determined by firing at different temperatures in the range of 400°–430° C. with a constant hold time of 2 hours.

Spectral transmittance data were measured on the several samples at 10 nm intervals over the wavelength range 300–790 nm using a rapid scan spectrophotometer. Tristimulus values and scotopic transmittance were computed for each lens by the weighted ordinate method using 1931 CIE illuminant C. From the several lens samples thus produced, a few lenses that satisfied the nominal design criteria were selected to be framed for further use.

Figure 2:
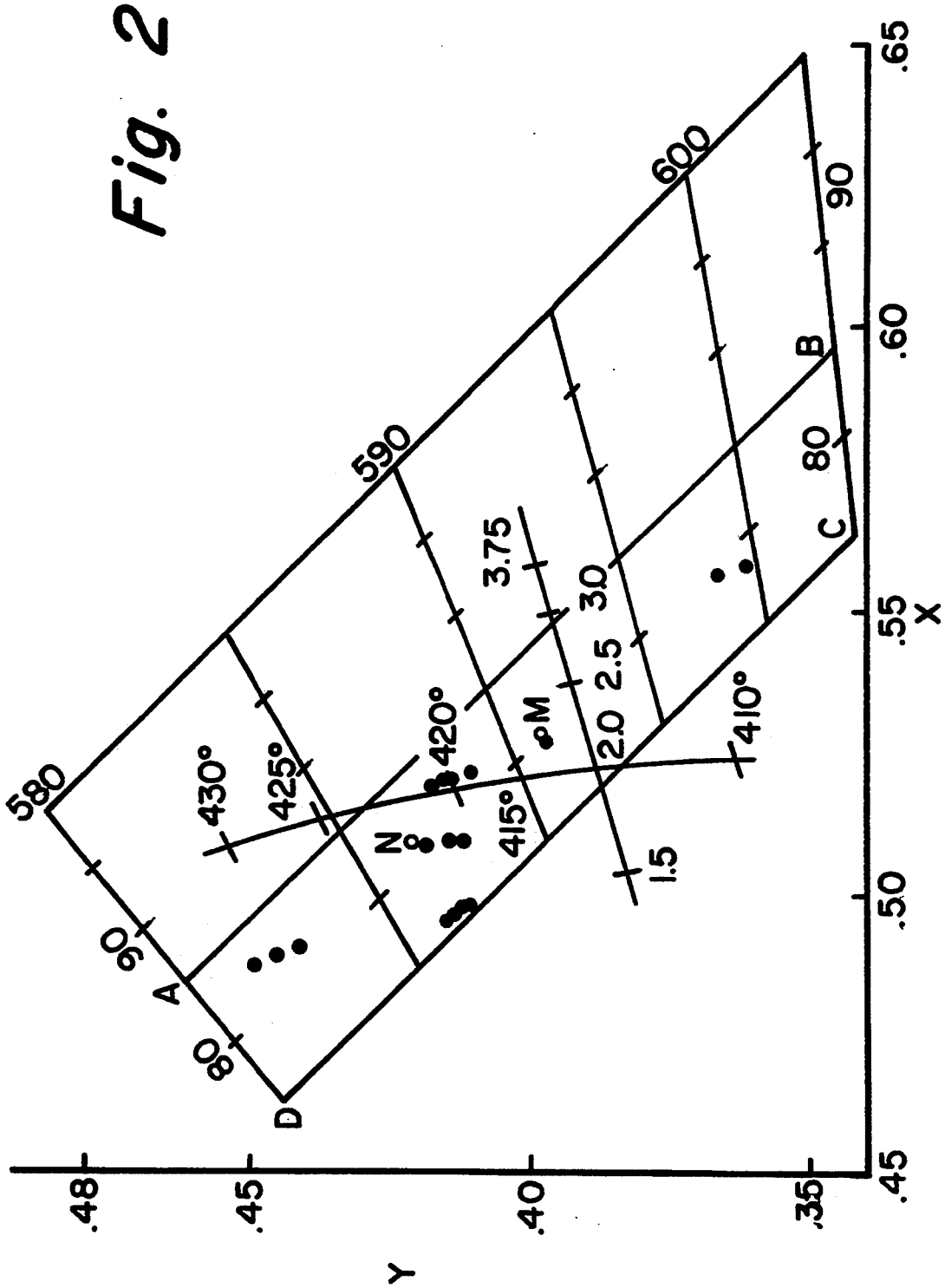
FIG. 2 is a color mixture diagram showing the effect of firing time and firing temperature, respectively, on dominant wavelength and spectral purity.

FIG. 2 is a color mixture diagram in which x coordinates are plotted along the vertical axis and y coordinate values are plotted along the horizontal axis. The sample data were calculated using Illuminant C and the CIE Standard Observer. Dominant wavelength lines at 5 nm intervals are indicated, and spectral purity locations between 75 and 100% are shown at 5% spacings.

Data from a temperature excursion with a 2 hour hold time, and from a time excursion with a 415° C. temperature hold, are plotted in curves generated in FIG. 2. The times and temperatures are indicated along the curves. Specific examples of lenses having properties that are within the scope of the invention are indicated by small dots in FIG. 2. Property ranges defining the invention fall within the box ABCDA.

TABLE III shows the effect of ambient temperature on the darkened photopic transmittance ($Y_P$) and the scotopic transmittance ($Y_S$) of a selected lens. Temperatures are in ° C. and ° F., and transmittance values are in percent.

TABLE III

| Temperature | | Darkened Transmittance | |
|---|---|---|---|
| °C. | °F. | $Y_P$ | $Y_S$ |
| 2 | 36 | 4.1 | 1.1 |
| 13 | 55 | 5.1 | 1.4 |
| 25 | 77 | 6.7 | 1.8 |
| 40 | 104 | 9.5 | 2.6 |

Viewer evaluations were conducted by making comparisons in bright sunlight, making sure that the eyes were first adapted to looking through the filter lens. Observers were asked to note particularly the appearances of whites and blues. Differences of the sky, when viewed through the several lenses, were easily discerned, and were used as a preference criterion. Certain bright blue automotive paints shifted strongly toward green when viewed through some lenses, while the same colors appeared quite natural with other lenses. Lenses differing in dominant wavelength by 2 nm are easily discernable, both in faded color of the lens and the effect on color balance of the scene being viewed.

Two lenses having spectral purity of around 80% were selected as optimum. One had a dominant wavelength near 590 nm. The other had a dominant wavelength near 593 nm. The redder (593) lens was preferred by some because it tended to accent "warmer" colors. The other lens provided a more neutral scene for viewing. Both lenses were felt to have small color distortion.

The lenses just described were fired in hydrogen for two (2) hours at 420° C. Color coordinates x and y were determined for the lens having a dominant wavelength near 593 nm. The values determined were x=0.5261 and y=0.3970. These values are plotted in FIG. 2 and identified by a small circle designated by the letter M. The photopic transmittance ($Y_P$) was determined to be 16.8; the scotopic transmittance was determined to be 4.6.

Figure 3:
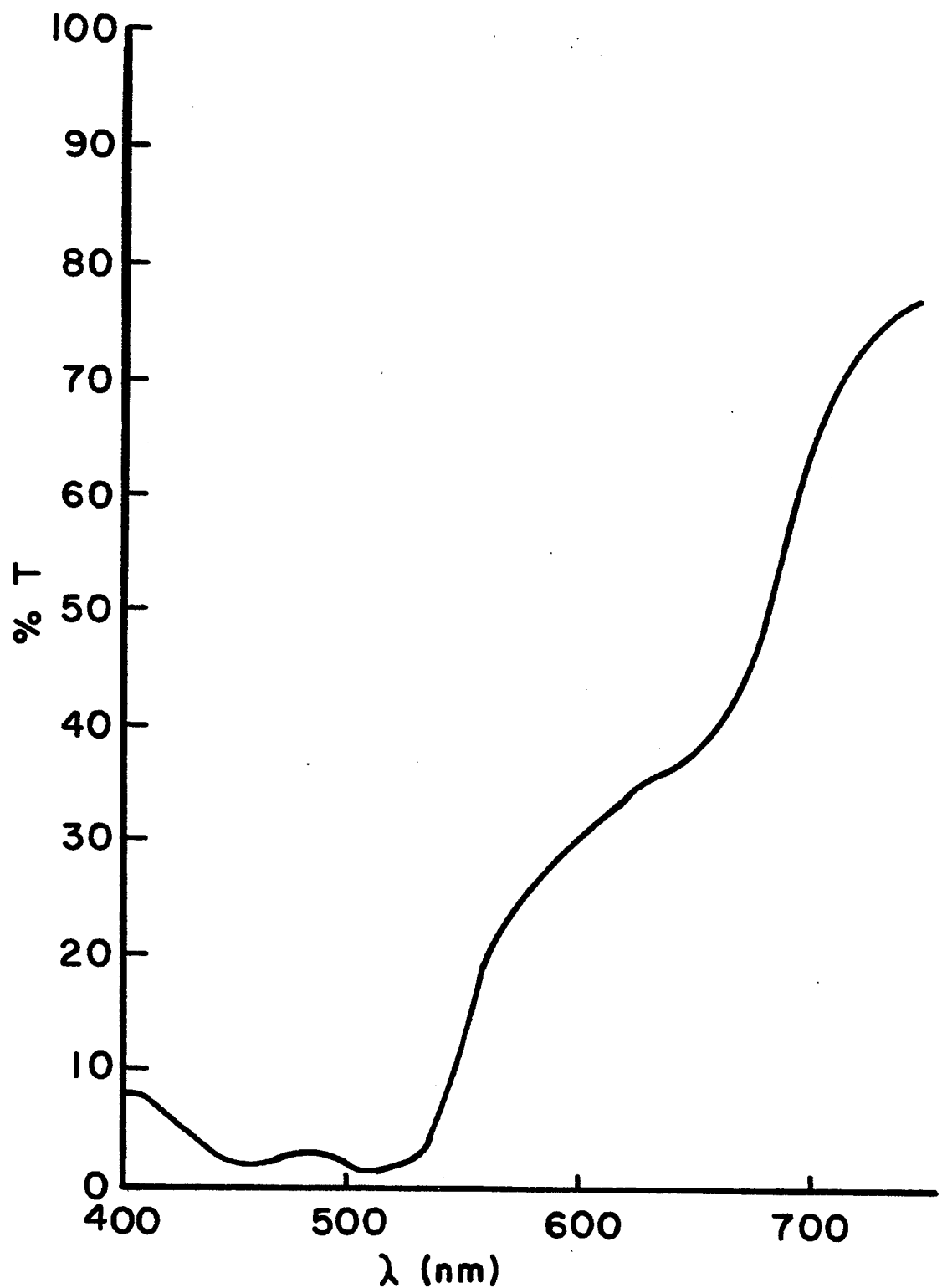
FIGS. 3 and 4 are graphical representations of transmittance curves for preferred embodiments of the invention.

FIG. 3 shows the transmittance curve for the glass lens just described. In this FIGURE, wavelength ($\lambda$) is plotted in nanometers on the horizontal axis, and percent transmittance (%T) is plotted on the vertical axis.

Lenses, designed for normal consumer use by persons having high sensitivity to sunlight, may be produced in a somewhat different manner. For this purpose, an untinted photochromic glass may be used. The glass is fired for a longer time in hydrogen and then front surfaced. This means that the front surface is removed to the depth that color has been induced by the firing.

There are at least two reasons for this alternate procedure. One is to avoid any filtering of the actinic radiation required to impart the photochromic feature. A second is to permit inserting a non-photosensitive segment for multifocal purposes without the segment, which does not color in the process, being so apparent.

Figure 4:
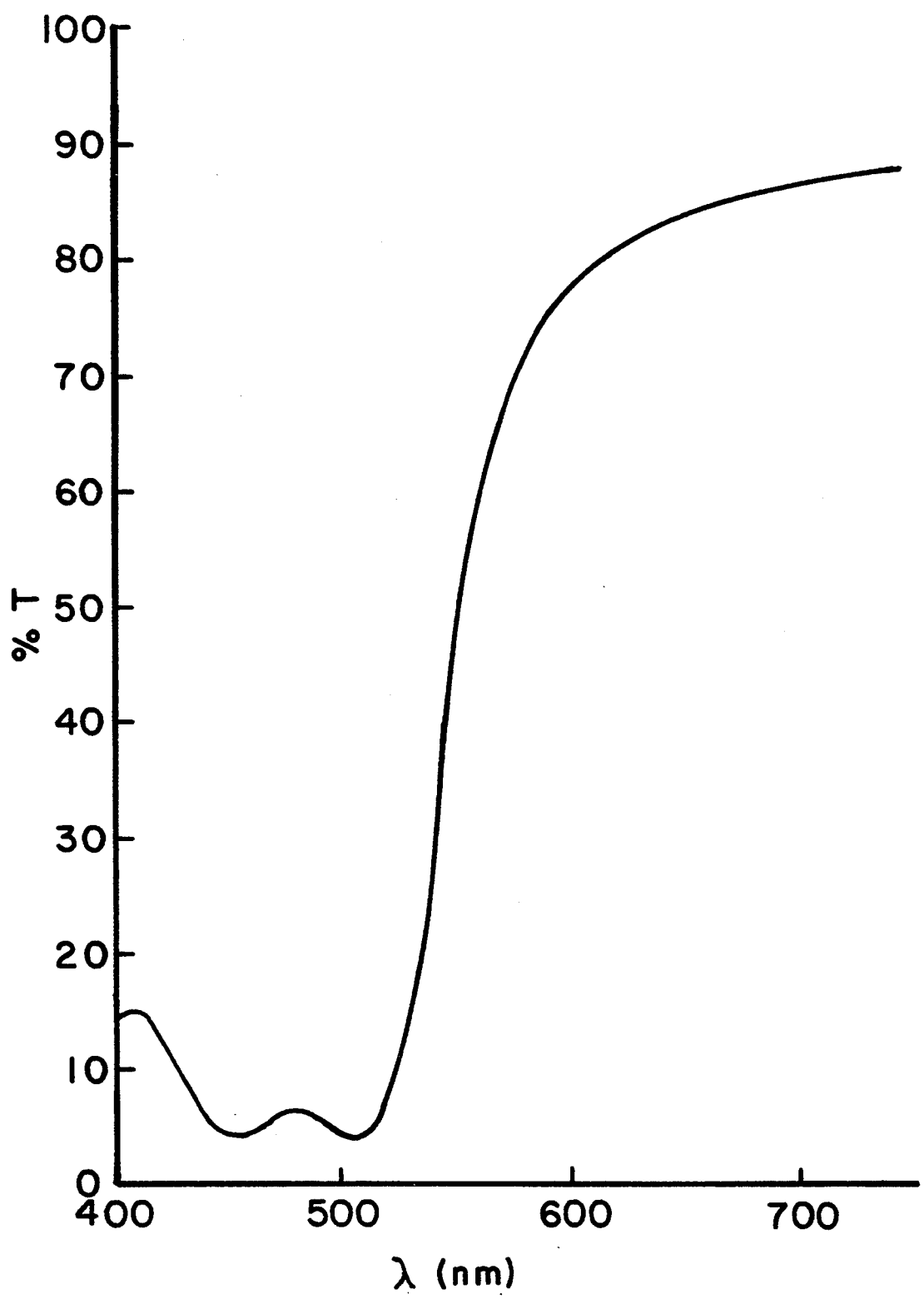

FIG. 4 is a graphical representation similar to that of FIG. 3. It shows the transmittance curve for a typical lens produced from an untinted glass for this latter purpose. The lens was molded from a standard commercial photochromic glass, Corning Code 8111. This glass has the following composition in approximate weight percent as calculated from the glass batch:

| | |
|---|---|
| $SiO_2$ | 55.8 |
| $Al_2O_3$ | 6.48 |
| $B_2O_3$ | 18.0 |
| $Li_2O$ | 1.88 |
| $Na_2O$ | 4.04 |
| $K_2O$ | 5.76 |
| $ZrO_2$ | 4.89 |
| $TiO_2$ | 2.17 |
| CuO | 0.011 |
| Ag | 0.24 |
| Cl | 0.20 |
| Br | 0.13 |

The lens was fired for eight (8) hours at 420° C. and then front surfaced. The following optical properties were then measured on the lens:

| | |
|---|---|
| $Y_P =$ | 45.5 |
| $Y_S =$ | 13.8 |
| Color purity = | 81% |
| Dominant wavelength = | 587 nm |
| Color coordinates | |
| x = | 0.5096 |
| y = | 0.4190 |

The color coordinate values are plotted in FIG. 2 and identified by a small circle designated N. The examples recited above indicate a preferred firing temperature of about 420° C. with a firing time depending on the purpose. However, as FIG. 2 suggests, variation in the time-temperature firing cycle is possible. Accordingly, I contemplate any time-temperature cycle within the ranges of 1-8 hours and 400°-430° C. that will produce glasses having a color purity of 75-85%, a dominant wavelength of 580-605 nm, preferably 585-595 nm, and a near natural color perception of a scene.

I claim:

1. An ophthalmic protective filter lens having a scotopic transmittance ($Y_S$) lower than the photopic transmittance ($Y_P$) by more than a factor of two, a dominant wavelength within the ranges of 580-605 nm and a color purity of 75-85 whereby colors perceived through the lens are approximately those of the scene being viewed.

2. A filter lens in accordance with claim 1 wherein the lens is produced using a photochromic glass.

3. A filter lens in accordance with claim 2 wherein the filter lens, in its faded state, has a photopic transmittance not over about 20% and the scotopic transmittance is 2.5-5%.

4. A filter lens in accordance with claim 2 wherein the filter lens, in its faded state, has a photopic transmittance in the range of 25-50% and a scotopic transmittance in the range of 5-15%.

5. A filter lens in accordance with claim 1 wherein the ratio of photopic to scotopic transmittance is at least 3:1.

6. A filter lens in accordance with claim 1 wherein the spectral purity is about 80%, the dominant wavelength is about 585-595 nm, and the lens provides minimal color distortion.

7. A filter lens in accordance with claim 2 wherein the filter lens is produced using an untinted photochromic glass.

8. A filter lens in accordance with claim 2 wherein the filter lens is produced using a tinted photochromic glass.

9. A filter lens in accordance with claim 1 wherein the filter lens is a photochromic glass having permanent induced color on both front and back surfaces.

10. A filter lens in accordance with claim 1 wherein the filter lens is a photochromic glass having permanent induced color on only the back surface.

11. A method of producing an ophthalmic protective filter lens which comprises firing a silver halide-containing photochromic glass lens in a hydrogen-containing atmosphere within the temperature range of 400°-430° C. for a time of 1-8 hours to impart a scotopic transmittance lower than the photopic transmittance by a factor of at least two, a dominant wavelength within the ranges of 580-605 nm and a color purity of 75-85 whereby colors perceived through the lens are approximately those of the scene.

12. A method in accordance with claim 11 wherein the photochromic lens is fired at about 420° C. for two hours.

13. A method in accordance with claim 11 wherein the photochromic lens is fired at about 420° C. for about 8 hours.

14. A method in accordance with claim 13 wherein, after firing, the lens is front surfaced to remove all color from that surface.

* * * * *

UNITED STATES PATENT AND TRADEMARK OFFICE
CERTIFICATE OF CORRECTION

PATENT NO. : 5,381,193
DATED : January 10, 1995
INVENTOR(S) : Brent M. Wedding

It is certified that error appears in the above-indentified patent and that said Letters Patent is hereby corrected as shown below:

Column 1, line 21, "visions" should be --vision--.

Column 2, line 67, the numerical range should be --5-15%--.

Column 5, line 32, "75-525" should be --475-525--.

Column 5, line 68, --1931-- should be inserted at the end of the line.

Signed and Sealed this

Twenty-fifth Day of April, 1995

Attest:

BRUCE LEHMAN

Attesting Officer     Commissioner of Patents and Trademarks